US012061928B1

(12) United States Patent
Anjanappa

(10) Patent No.: US 12,061,928 B1
(45) Date of Patent: Aug. 13, 2024

(54) CLOUD-BASED JOB SCHEDULING AND MANAGEMENT SERVICE

(71) Applicant: Amazon Technologies, Inc., Seattle, WA (US)

(72) Inventor: Akash Anjanappa, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 632 days.

(21) Appl. No.: 17/031,469

(22) Filed: Sep. 24, 2020

(51) Int. Cl.
*G06F 9/48* (2006.01)
*G06F 9/50* (2006.01)
*G06F 9/54* (2006.01)
*G06F 11/34* (2006.01)

(52) U.S. Cl.
CPC .......... *G06F 9/4887* (2013.01); *G06F 9/5072* (2013.01); *G06F 9/542* (2013.01); *G06F 9/547* (2013.01); *G06F 11/3409* (2013.01); *G06F 2201/86* (2013.01); *G06F 2209/508* (2013.01)

(58) Field of Classification Search
CPC ...... G06F 9/4887; G06F 9/5072; G06F 9/542; G06F 9/547; G06F 11/3409; G06F 2201/86; G06F 2209/508
See application file for complete search history.

(56) References Cited

U.S. PATENT DOCUMENTS

| 9,563,478 | B1* | 2/2017 | Miller .................. G06F 9/5038 |
| 10,708,358 | B1* | 7/2020 | Diasti .................. G06F 40/106 |
| 2004/0078777 | A1* | 4/2004 | Bahrami ............. G06Q 10/067 705/348 |
| 2006/0075391 | A1* | 4/2006 | Esmonde, Jr. ......... G06Q 10/10 717/136 |
| 2018/0302277 | A1* | 10/2018 | Shimamura ........... H04L 41/145 |
| 2020/0104378 | A1* | 4/2020 | Wagner .................. G06F 9/546 |
| 2020/0272338 | A1* | 8/2020 | Huang .................. G06F 3/0613 |
| 2020/0394110 | A1* | 12/2020 | Ramohalli Gopala Rao ............... G06F 16/285 |

* cited by examiner

*Primary Examiner* — Emerson C Puente
*Assistant Examiner* — Jonathan R Labud
(74) *Attorney, Agent, or Firm* — Eversheds Sutherland (US) LLP

(57) ABSTRACT

Devices, systems, and methods are provided for cloud-based job scheduling and management. A method may include receiving, by at least one serverless processor of a cloud-based network, data from a first interface. The method may include determining, based on the data, a first activity and a second activity, the first activity associated with a first service of the cloud-based network, and the second activity associated with a second service of the cloud-based network. The method may include determining, based on the data, a precondition associated with causing execution of the first activity and the second activity. The method may include determining that an event associated with the cloud-based network has occurred, and generating an instance associated with causing performance of the first activity and the second activity. The method may include discarding the instance after performance of the first activity and the second activity.

20 Claims, 6 Drawing Sheets

CLOUD-BASED JOB SCHEDULING AND MANAGEMENT SERVICE

BACKGROUND

Cloud-based services are being used more frequently by more parties and for more functions. Some networking computing environments that provide cloud-based services may require multiple different ways to provide data and execute functions with different cloud-based services, including requiring the use of applications and systems external to the networking computing environments.

Figure 1:
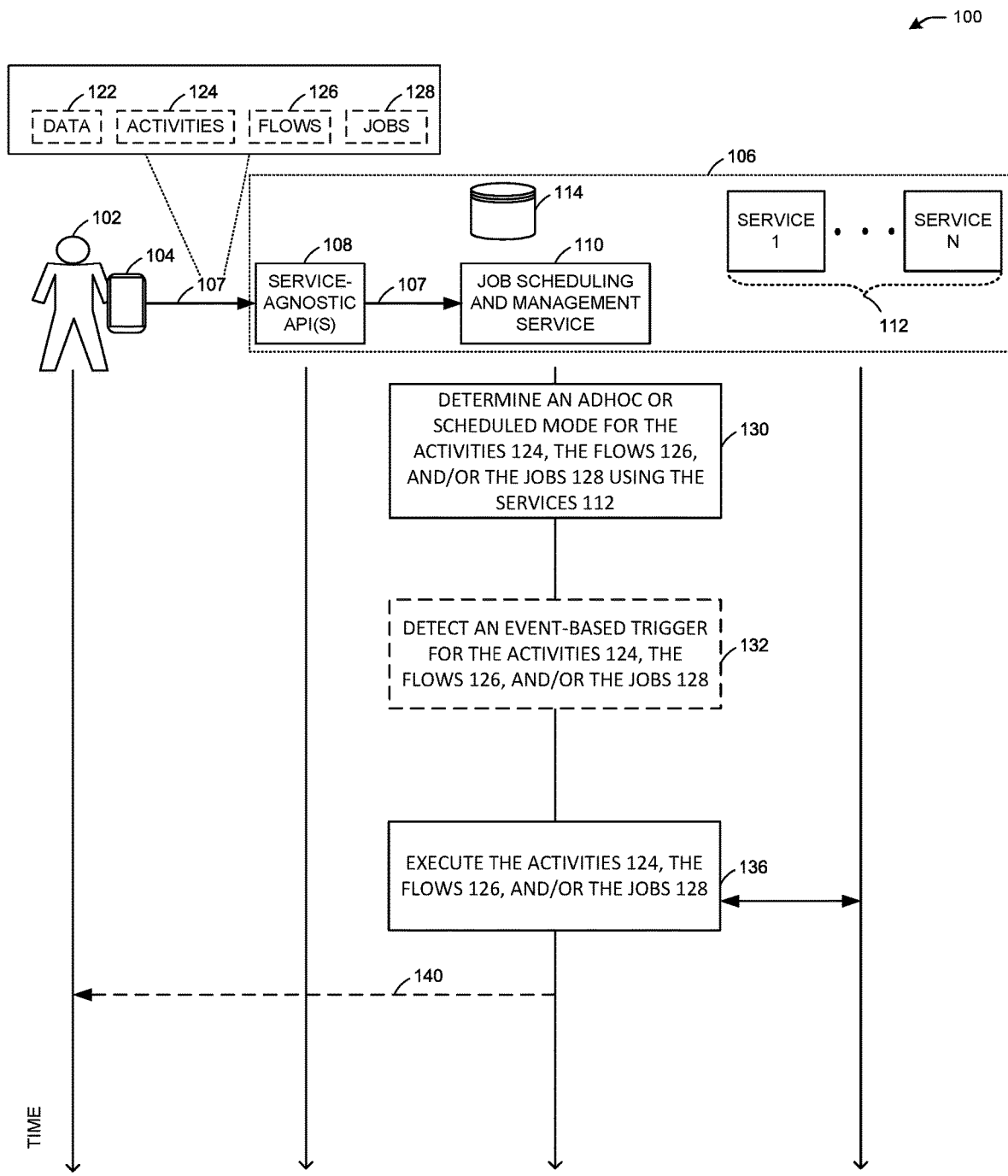
FIG. 1 illustrates an example process for orchestrating cloud-based jobs for serverless applications, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for cloud-based job scheduling and management.

People increasingly are using cloud-based environments to store and manage large amounts of data and to execute activities, jobs, and flows. Cloud-based environments may allow for job scheduling capabilities, such as the scheduled execution of activities and flows in the cloud-based environments. An activity may refer to a task that may run independently (e.g., decoupled from a flow, allowing for reuse of the activity by multiple different flows). A flow may refer to a combination of one or more activities executing in series or in parallel. A job may refer to schedule information and configurations that facilitate execution of a flow.

Activities, jobs, and flows that may be executed in a cloud-based environment may use event-driven serverless computing and multiple different services (e.g., batch computing services, data preparation and loading services, message queuing services, and other services). Serverless computing may execute code in response to events, allowing on-demand applications that may execute within milliseconds of an event. Serverless computing instances may include storage that last only for the duration of an instance, and may be discarded once the tasks executed by the instance have completed. Complex tasks using serverless computing tasks that involve multiple different cloud-based services may require coordination that may be difficult for a user.

To manage the large amounts and different types of data that may be used in complex flows, jobs, and activities, traditional databases, data warehouses, and data lakes provide data storage options. In particular, data lakes allow for immediate loading of structured and unstructured data in variety of formats and types without the need for schema dedicated to a particular type or source of data. Data lakes allow for data to be loaded in the native format of the data, allowing for unlimited types of data. Data lakes may facilitate faster user access to data that does not require expensive data modeling to allow for loading of different types of data from different sources. Data lakes also may be more scalable than some other types of data storage.

To schedule and manage jobs in a cloud-based environment, a service may use state machine (e.g., step functions) and watch events, may allow for persisting job information, and may monitor jobs and job-related tasks. For example, event-based on-demand instances (e.g., virtual containers generated by machine images) may facilitate job scheduling (e.g., instead of data driven instances, for example). When a job is triggered by another service, an on-demand serverless service may be instantiated and run in a different environment (e.g., a stateless execution) to facilitate scheduling of the job (e.g., a job to execute a flow daily may cause daily instantiation of an on-demand service).

However, some on-demand services used to facilitate job scheduling for network computing environments (e.g., cloud-based environments) may lack data separation, data access application programming interfaces (APIs), and other design principles that may allow for efficient management and scheduling of jobs and flows for a network computing environment.

In particular, some network computing environments may lack a native solution (e.g., native to a network computing environment) to manage and schedule flows and jobs, particularly serverless flows and jobs, monitor the flows and jobs, and notify network computing environment users of any issues associated with the scheduling and management of flows and jobs. Because of the above-described data separation and lack of service-agnostic APIs, some network computing environments may not allow for a user to manage flows and jobs in one place, thereby causing scheduling and management of flows and jobs for the network computing environments to require many steps that may be time-consuming. Some network computing environments may require a user to manually integrate the steps involved in workflow scheduling, monitoring, notifying, and the like, with one or more services of a network computing environment. For example, executing a flow and/or job that includes multiple actions that use different network computing services, such as an activity using a serverless computing service and an activity using a batch computing service, may require a user to initiate the actions individually using the different services and their respective interfaces, rendering integration of the use of the different services for the flow and/or job difficult and inefficient.

In addition, some cloud-based services may require interfaces unique to a particular service to upload data and cause execution of serverless jobs and flows, and may require manual instantiation and teardown.

There is therefore a need for enhanced job and flow scheduling management that is native to a network computing environment.

In one or more embodiments, a network computing environment (e.g., a cloud-based data and computing environment) may include a native scheduling and management service to allow users to create, manage, and monitor serverless flows (e.g., workflows) and jobs that may involve multiple different types of serverless services. The native scheduling and management service may orchestrate jobs for serverless applications. For example, the flows may invoke customized user-defined tasks involving event-driven serverless computing services, batch computing services, data preparation and loading services, message queuing services, system-to-system messaging services, application-to-person messaging services, and the like. A user may provide job context to the native scheduling and management service, and the native scheduling and management service may coordinate with other services (e.g., the above-described services) provided by the network computing environment to generate resources, manage flows and jobs, and send notifications associated with the management and scheduling of flows and jobs. The native scheduling and management service may provide flexibility to build custom workflows that may involve multiple services provided by the network computing environment, perform sequential and parallel tasks, and facilitate use of cross-account resources.

In one or more embodiments, the native scheduling and management service may provide well-defined APIs with secured access management of workflows for the network computing environment. For example, the APIs may allow users to create activities, jobs, and flows, and may be exposed to end users to allow for easy uploading of data and management of activities. In this manner, the native scheduling and management service may provide an interface to users with which to access data and generate flows and jobs in the network computing environment (e.g., the above-described services).

In one or more embodiments, the native scheduling and management service may be stateless and agnostic to a particular service in the network computing environment. For example, many workflows in the network computing environment may use serverless applications (e.g., event-based functions) that are not unique to any particular service in the network computing environment (e.g., may be available to multiple services in the network computing environment). In this manner, an interface used by the native scheduling and management service and exposed to end users may allow end users to schedule and manage flows and jobs that include using resources provided by multiple different services in the network computing environment (e.g., as opposed to requiring different APIs for different services). The native scheduling and management service may allow for backfill, "adhoc" (e.g., execute a job once), and scheduled run (e.g., execute a job multiple times based on a schedule) features in the network computing environment. For example, in a scheduled mode, when a start date for execution of a job or flow is prior to the current date, a backflow function may run first. In adhoc mode, a user may specify backfill dates. The jobs may include data lake and data preparation and loading jobs, for example, but is not limited to only such jobs. The native scheduling and management service may facilitate separation and storage of data based on the functionality of the data, resulting in a solution for services that rely on data lakes, for example.

In one or more embodiments, the native scheduling and management service may allow for cloning of activities, flows, and jobs. Scheduling information may be isolated from flows and activities, enabling users to clone activities, flows, and job schedules.

In one or more embodiments, the native scheduling and management service may provide permission-based access to a workflow managed by the native scheduling and management service. For example, the APIs used by the native scheduling and management service may be authenticated by an access management service of the network computing environment. Users may be included in an allowed list of users, roles, and/or services to grant or deny access to the native scheduling and management service, and to use the native scheduling and management service (e.g., all APIs or a subset of one or more APIs) for particular functions (e.g., read, write, etc.). A group identifier may be used to group activities and flows. Permissions may be applied based on the group identifier. Resources such as activities, flows, and jobs may be grouped, and users may be allowed to access resources for a group based on the permissions. Users may belong to one or more groups and may have access to resources only for the groups to which they belong. A service may create groups and users, including lists of users approved to access a group's resources. When a job is created, the native scheduling and management service may communicate with the service to determine whether the user is authorized to access the resources for the job.

In one or more embodiments, the native scheduling and management service may support parallel and sequential tasks in a flow. Complex flows may use both parallel and sequential actions. The native scheduling and management service may allow for options to fail or continue when an activity of a flow fails, and an option to skip some activities when executing a flow.

In one or more embodiments, the native scheduling and management service may use a serverless function orchestrator (e.g., available for use by multiple different services) to coordinate jobs in a workflow. Events and rules may be defined by users to schedule execution of flows. When a job is triggered by an event or rule to run, and when the job is scheduled, the native scheduling and management service may build a state machine and store a resource name (e.g., uniquely identifying a resource in the network computing environment) in a job table, and may enable an event to trigger the execution of the job. When backfill is enabled, the native scheduling and management service may manage backfill dates and run subsequent dates. Job execution may result in a record in a table that stores data indicating when a job has been executed.

In one or more embodiments, the tasks and configurations for an activity may be self-contained. An activity may be de-coupled from a flow and from other activities, thereby allowing reuse of the activity in multiple different flows. In this manner, the native scheduling and management service may facilitate reuse of activities in different flows.

In one or more embodiments, the native scheduling and management service may provide a template function to allow for user customization of serverless jobs and flows that may use multiple services in the network computing environment. The template may allow for event-based instantiation by different services in the network computing environment, and for automatic teardown once a function has executed.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for orchestrating cloud-based jobs for serverless applications, in accordance with one or more example embodiments of the present disclosure.

Referring to FIG. 1, the process 100 may include a user 102 of a device 104 that may execute cloud-based jobs for serverless applications in a cloud-based network 106. The user 102 may use the device 104 to make calls 107 (e.g., API calls) to one or more service-agnostic APIs 108 of the cloud-based network 106 (e.g., the one or more service-agnostic APIs 108 may integrate with multiple different types of services in the cloud-based network 106). The one or more service-agnostic APIs 108 may be exposed to the user 102 via the device 104. The one or more service-agnostic APIs 108 may call a job scheduling and management service 110 of the cloud-based network 106 based on the calls 107. The job scheduling and management service 110 may include serverless computing functions, and may facilitate orchestration of cloud-based jobs for serverless applications based on the calls 107. To orchestrate cloud-based jobs for serverless applications based on the calls 107, the job scheduling and management service 110 may execute one or more activities, flows, and jobs that may use one or multiple services 112 (e.g., serverless services) provided by the cloud-based network 106 (e.g., service 1, . . . , service N), and may use data stored in data storage 114 (e.g., data lakes or other data storage). The calls 107 may include any combination of data 122 (e.g., structured or unstructured), defined activities 124 (self-contained tasks and configurations defining what is to be done and how), flows 126 (e.g., a sequence of activities), and/or jobs 128 (e.g., defining which activities and/or flows to run, when, etc.). The activities 124, the flows 126, and the jobs 128 may use multiple of the services 112 (e.g., one activity may use service 1, another activity may use service 2). In this manner, the one or more service-agnostic APIs 108 may facilitate the orchestration of activities, flows, and jobs in the cloud-based network 106 regardless of which of the services 112 are used by the activities, flows, and jobs defined by the calls 107.

Still referring to FIG. 1, the job scheduling and management service 110 may determine, based on the information in the calls 107, whether the activities 124, the flows 126, and/or the jobs 128 are adhoc or scheduled. At step 132, the scheduling and management service 110 may detect an event-based trigger for the activities 124, the flows 126, and/or the jobs 128. For example, the event-based trigger may be based on detected data modifications made in the cloud-based network 106, other API calls, modification of content of the services 112, or many other types of events. The event detection may be optional. In particular, events may be on-demand in a synchronous or asynchronous manner. When the activities 124, the flows 126, and/or the jobs 128 are to be executed, based on an event or otherwise, the job scheduling and management service 110 may, at step 136, execute the activities 124, the flows 126, and/or the jobs 128 using the services 112. At step 140, optionally the job scheduling and management service 110 may send one or more notifications to the device 104 (e.g., indicating that the execution occurred or failed, etc.).

In one or more embodiments, the job scheduling and management service 110 may be native to the cloud-based network 106, and may allow users to create, manage, and monitor serverless flows and jobs that may involve multiple different types of serverless services (e.g., the services 112). The job scheduling and management service 110 may orchestrate jobs for serverless applications. For example, the flows 126 may invoke customized user-defined tasks involving event-driven serverless computing services, batch computing services, data preparation and loading services, message queuing services, system-to-system messaging services, application-to-person messaging services, and the like. The user 102 may provide job context (e.g., the jobs 128) to the job scheduling and management service 110, and the job scheduling and management service 110 may coordinate with the services 112 to generate resources, manage flows and jobs, and send notifications associated with the management and scheduling of flows and jobs. The job scheduling and management service 110 may provide flexibility to build custom workflows that may involve multiple services provided by the cloud-based network 106, perform sequential and parallel tasks, and facilitate use of cross-account resources.

In one or more embodiments, the one or more service-agnostic APIs 108 may allow users to create the activities 124, jobs 128, and flows 126, and may be exposed to end users to allow for easy uploading of data and management of activities. In this manner, the job scheduling and management service 110 may provide an interface to users with which to access data and generate flows and jobs in the cloud-based network 106.

In one or more embodiments, the job scheduling and management service 110 may be stateless and agnostic to a particular service in the cloud-based network 106. For example, many workflows in the cloud-based network 106 may use serverless applications (e.g., event-based functions) that are not unique to any particular service in the cloud-based network 106 (e.g., may be available to multiple services in the cloud-based network 106). In this manner, the one or more service-agnostic APIs 108 exposed to end users may allow end users to schedule and manage flows and jobs that include using resources provided by the different services 112 in the network computing environment (e.g., as opposed to requiring different APIs corresponding to different services). The job scheduling and management service 110 may allow for backfill, "adhoc" (e.g., execute a job once), and scheduled run (e.g., execute a job multiple times based on a schedule) features in the network computing environment.

In one or more embodiments, the job scheduling and management service 110 may allow for cloning of activities, flows, and jobs. Scheduling information may be isolated from flows and activities, enabling users to clone activities, flows, and job schedules.

Figure 3:
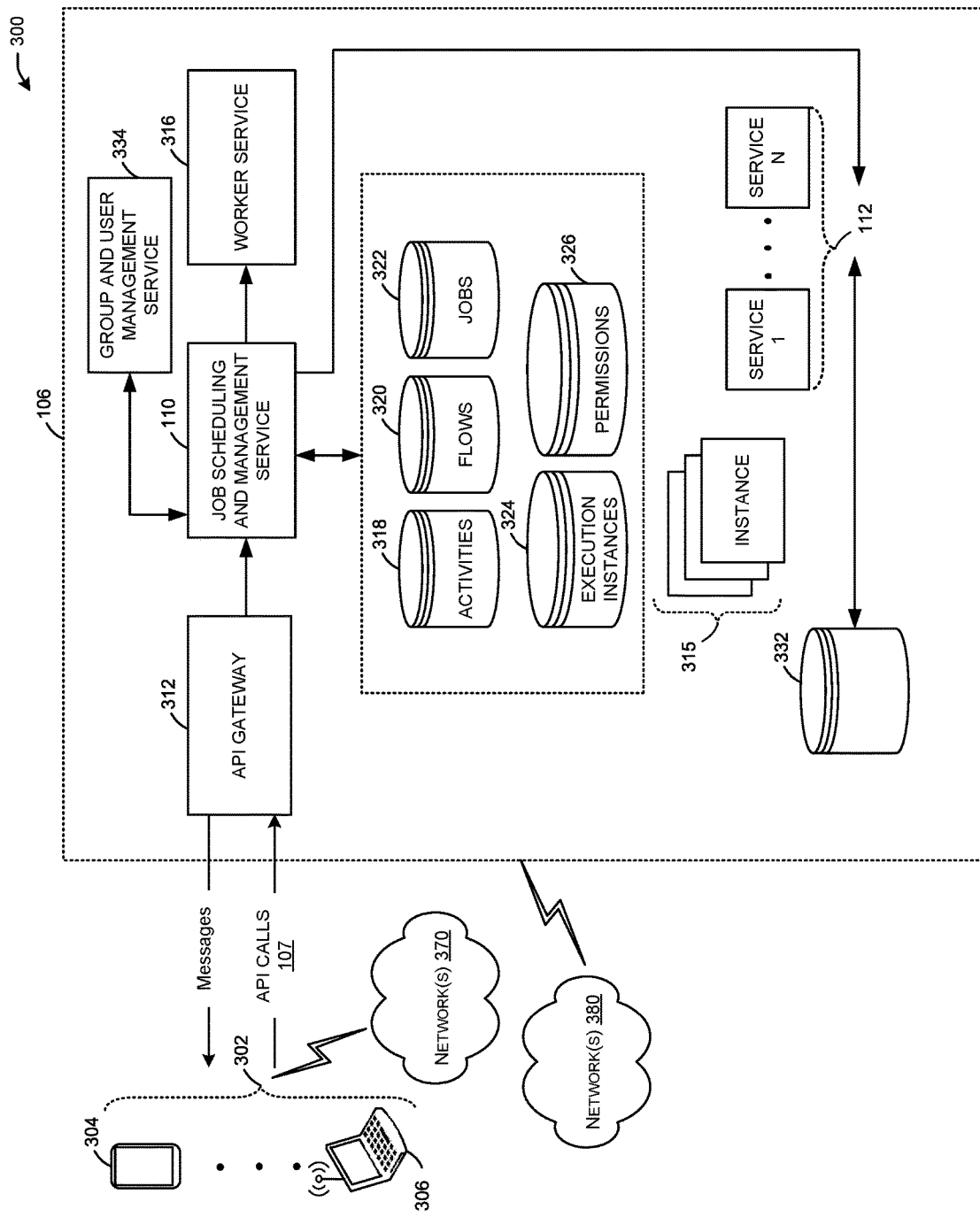
FIG. 3 illustrates an example system for orchestrating cloud-based jobs for serverless applications, in accordance with one or more example embodiments of the present disclosure.

In one or more embodiments, the job scheduling and management service 110 may provide permission-based access to a workflow managed by the job scheduling and management service 110. For example, the one or more service-agnostic APIs 108 used by the job scheduling and management service 110 may be authenticated by an access management service (e.g., as shown in FIG. 3). Users may be included in an allowed list of users, roles, and/or services to grant or deny access to the native scheduling and management service, and to use the native scheduling and management service (e.g., all APIs or a subset of one or more APIs) for particular functions (e.g., read, write, etc.). A group identifier may be used to group activities and flows. Permissions may be applied based on the group identifier.

Figure 2:
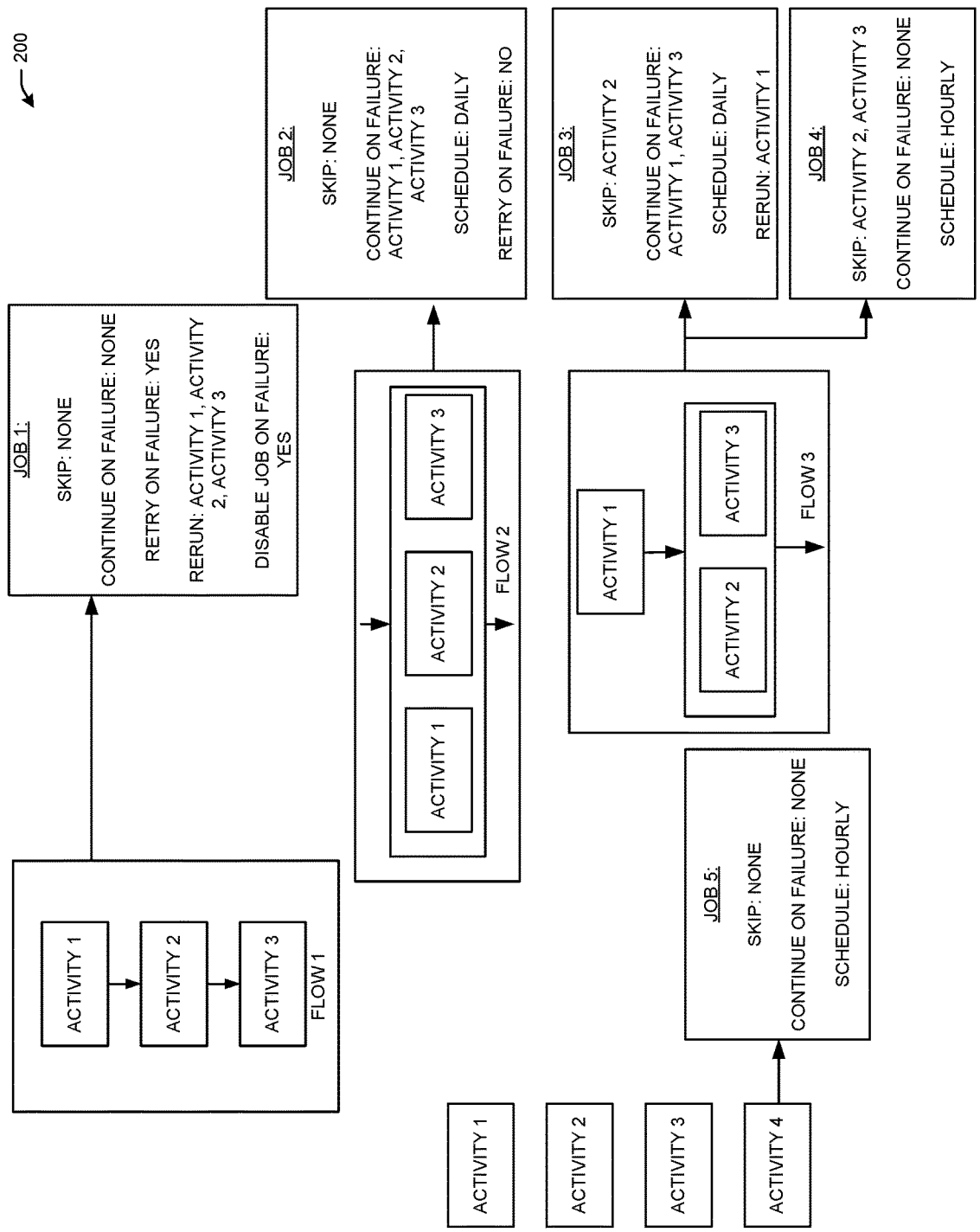
FIG. 2 illustrates example activities performed in cloud-based jobs for serverless application, in accordance with one or more example embodiments of the present disclosure.

In one or more embodiments, the job scheduling and management service 110 may support parallel and sequential tasks in a flow. Complex flows may use both parallel and sequential actions. The job scheduling and management service 110 may allow for options to fail or continue when an activity of a flow fails, and an option to skip some activities when executing a flow. Examples of the activities 124, the flows 126, and the jobs 128 are shown in FIG. 2.

In one or more embodiments, the job scheduling and management service 110 may use a serverless function orchestrator (e.g., available for use by the services 112) to coordinate jobs in a workflow. Events and rules may be defined by users to schedule execution of flows. When a job is triggered by an event or rule to run, and when the job is scheduled, the job scheduling and management service 110 may build a state machine and store a resource name (e.g., uniquely identifying a resource in the network computing environment) in a job table (e.g., as shown in FIG. 3), and may enable an event to trigger the execution of the job. When backfill is enabled, the job scheduling and management service 110 may manage backfill dates and run subsequent dates. Job execution may result in a record in a table that stores data indicating when a job has been executed.

In one or more embodiments, the tasks and configurations for an activity may be self-contained. An activity may be de-coupled from a flow and from other activities, thereby allowing reuse of the activity in multiple different flows. In this manner, the job scheduling and management service 110 may facilitate reuse of activities in different flows, as shown in FIG. 2.

The device 104 and/or the cloud-based network 106 may include any suitable processor-driven device including, but not limited to, a mobile device or a non-mobile, e.g., a static, device. For example, the device 104 and/or the cloud-based network 106 may include a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, or the like. It is understood that the above is a list of devices.

FIG. 2 illustrates example activities 200 performed in cloud-based jobs for serverless application, in accordance with one or more example embodiments of the present disclosure.

Referring to FIG. 2, the activities 200 may include activity 1, activity 2, activity 3, and activity 4. An activity may refer to a task that may run independently (e.g., decoupled from a flow, allowing for reuse of the activity by multiple different flows). Any of the activities may include tasks to be executed by a serverless instance (e.g., generated and discarded by the job scheduling and management service 110 of FIG. 1), and the tasks of an activity may correspond to (e.g., may use) a particular service. For example, the activity 1 may include tasks (e.g., uploading data to, downloading data from, editing content of, etc.) for service 1 of FIG. 1, and activity 2 may include tasks for service 2 of FIG. 1. In this manner, the one or more service-agnostic APIs 108 of FIG. 1 may allow for the generation of the activities 200 using different services without requiring APIs specific to the particular service used by any activities, thereby allowing for a user-friendly interface with which to create and manage flows and jobs that may reuse the activities 200.

Still referring to FIG. 2, a first flow may include a sequential execution of activity 1, followed by activity 2, followed by activity 3. A flow may refer to a combination of one or more activities executing in series or in parallel. Job 1 may define the timing and configuration of the execution of flow 1, such as whether to skip any activity in flow 1, whether to continue on failure ("continueonfaliure" of execution) of any listed activity in flow 1, whether the job is scheduled or adhoc (e.g., no schedule indicates adhoc mode, which may be configured to run once or rerun), whether to retry on failure (e.g., the number of retries and the delay time between tries in response to a failure of any activity tasks, activities, or flows), whether to rerun any activity, the entire flow, or any specific tasks defined by an activity, and/or whether to disable the job on failure (e.g., define the activities whose failure to execute may disable the job), to enable, or to pause jobs for the flow and its activities. A job may refer to schedule information and configurations that facilitate execution of a flow. Job 1 may be considered adhoc because it provides no scheduled execution of flow 1. Other flows may reuse the activities 200. For example, flow 2 may include a parallel execution of activity 1, activity 2, and activity 3. Job 2, corresponding to flow 2, may define a daily schedule for flow 2, and may define the configuration for flow 2 (e.g., no activities skipped, a continue on failure of activity 1, activity 2, or activity 3—referring to the flow continuing even if one of the activities fails because of the parallel structure of flow 2, and no retry upon failure to execute). Flow 3 may include a combined sequential and parallel structure in which activity 1 may be executed before a parallel execution of activity 2 and activity 3. Multiple jobs may be associated with any flow. For example, job 3 and job 4 may define flow 3. Job 3 may allow for activity 2 to be skipped, a continue on failure of activity 1 or activity 3, may define a daily schedule (e.g., daily execution), and may define a rerun at the activity level (e.g., rerun activity 1 only). Job 4 may allow for activity 2 or activity 3 to be skipped, may not allow for continuing on failure of any activity, and may call for an hourly execution schedule. Some activities may be executed separately (e.g., not as part of a flow that includes multiple activities), and jobs may define the execution of individual activities. For example, activity 4 execution may be controlled by job 5, which may set an hourly execution schedule for activity 4, and may not allow for any skipping or continuing on failure.

In one or more embodiments, the job scheduling and management service 110 of FIG. 1 may support parallel and sequential tasks in a flow as shown in FIG. 2. Complex flows may use both parallel and sequential actions. The job scheduling and management service 110 may allow for options to fail or continue when an activity of a flow fails, and an option to skip some activities when executing a flow. The jobs 128 of FIG. 1 may correspond to the jobs in FIG. 2, thereby allowing users to create and manage activities and flows based on the configurations defined by the jobs.

In one or more embodiments, events and rules may be defined by users to schedule execution of flows. When a job is triggered by an event or rule to run, and when the job is scheduled, the job scheduling and management service 110 may build a state machine and store a resource name (e.g., uniquely identifying a resource in the network computing environment) in a job table, and may enable an event to trigger the execution of the job. When backfill is enabled, the job scheduling and management service 110 may manage backfill dates and run subsequent dates. Job execution may result in a record in a table that stores data indicating when a job has been executed, as shown in FIG. 3.

In one or more embodiments, execution of any activity may include multiple tasks, such as a precondition check, an execution instance insertion, a job execution task, a check job status task, an update execution instance task, and the like.

FIG. 3 illustrates an example system 300 for orchestrating cloud-based jobs for serverless applications, in accordance with one or more example embodiments of the present disclosure.

Referring to FIG. 3, one or more devices 302 (e.g., device 304, device 306), similar to the device 104 of FIG. 1, may make the API calls 107 of FIG. 1 (e.g., using the one or more service-agnostic APIs 108 of FIG. 1) to the cloud-based network 106 of FIG. 1. The API calls 107 may include data (e.g., the data 122 of FIG. 1), activities (e.g., the activities 124 of FIG. 1), flows (e.g., the flows 126 of FIG. 1), and/or jobs (e.g., the jobs 128 of FIG. 1), and may be received by an API gateway 312 of the cloud-based network 106. The API gateway 312 may route the API calls 107 to the proper endpoint, such as the job scheduling and management service 110 of FIG. 1 of the cloud-based network 106. The job scheduling and management service 110 may be a serverless computing service that may launch serverless instances 315 based on the contents of the API calls 107 (e.g., as defined by the activities, flows, and jobs). The job scheduling and management service 110 may detect events in the cloud-based network 106 that may trigger the execution of activities, flows, and jobs defined by the content of the API calls 107. When a job is triggered by an event or rule to run, and when the job is scheduled, the job scheduling and management service 110 may identify an event that may trigger the execution of the job. The job scheduling and management service 110 may communicate with a worker service 316 (e.g., using a serverless computing call to generate a temporary serverless computing instance), which may execute activities, flows, and jobs by launching the serverless instances 315 and tearing down the serverless instances 315 when the tasks for the activities, flows, and jobs have completed.

Still referring to FIG. 3, the job scheduling and management service 110 may store and have access to job data, flow data, activity data, a database of the instances 315, and permissions to use the job scheduling and management service 110. In particular, activities may be stored in an activities database 318, flows may be stored in a flows database 320, and jobs may be stored in a jobs database 322. When a job is triggered by an event or rule to run, and when the job is scheduled, the job scheduling and management service 110 may build a state machine and store a resource name (e.g., uniquely identifying a resource in the network computing environment) in a job table (e.g., in the jobs database 322), and may enable an event to trigger the execution of the job. When backfill is enabled, the native scheduling and management service may manage backfill dates and run subsequent dates. Job execution may result in a record in a table that stores data indicating when a job has been executed (e.g., stored in the execution instances database 324). The job scheduling and management service 110 may use a group and user management service 334 to provide permission-based access to a workflow managed by the job scheduling and management service 110. Users may be included in an allowed list of users, roles, and/or services (e.g., stored in a permissions database 326) to grant or deny access to the job scheduling and management service 110, and to use the job scheduling and management service 110 (e.g., all APIs or a subset of one or more APIs) for particular functions (e.g., read, write, etc.). A group identifier may be used to group activities and flows. Permissions may be applied based on the group identifier. The group and user management service 334 may create users and groups, and when a user attempts to access resources to perform an activity, flow, and/or job, the group and user management service 334 may indicate to the job scheduling and management service 110 whether the user is authorized to access the resources. The cloud-based network 106 also may include data storage (e.g., data lakes or other storage) to store uploaded data that may be used in the jobs, flows, and activities executed. The activities may correspond to a service, and flows may include multiple activities that define tasks involving the multiple services 112 of FIG. 1 (e.g., service 1, service N), as shown in FIG. 2. The services 112 may interact with (e.g., read from, write to, etc.) other data 332 (e.g., data storage or other resources).

In one or more embodiments, the job scheduling and management service 110 may be native to the cloud-based network 106, and may allow users to create, manage, and monitor serverless flows and jobs that may involve multiple different types of serverless services (e.g., the services 112). The job scheduling and management service 110 may orchestrate jobs for serverless applications. For example, activities and flows may invoke customized user-defined tasks involving event-driven serverless computing services, batch computing services, data preparation and loading services, message queuing services, system-to-system messaging services, application-to-person messaging services, and the like. The job scheduling and management service 110 may provide flexibility to build custom workflows that may involve multiple services provided by the cloud-based network 106, perform sequential and parallel tasks, and facilitate use of cross-account resources.

In one or more embodiments, the job scheduling and management service 110 may be stateless and agnostic to a particular service in the cloud-based network 106. For example, many workflows in the cloud-based network 106 may use serverless applications (e.g., event-based functions) that are not unique to any particular service in the cloud-based network 106 (e.g., may be available to multiple services in the cloud-based network 106). In this manner, the API calls 107 made using service-agnostic APIs exposed to the one or more devices 302 may allow end users to schedule and manage flows and jobs that include using resources provided by the different services 112 in the cloud-based network 106 (e.g., as opposed to requiring different APIs corresponding to different services). The job scheduling and management service 110 may allow for backfill, "adhoc"

(e.g., execute a job once), scheduled run (e.g., execute a job multiple times based on a schedule), reruns, retries, disable on failure, enabling jobs, pausing jobs, and other features and configurations in the cloud-based network 106.

In one or more embodiments, the job scheduling and management service 110 may allow for cloning of activities, flows, and jobs. Scheduling information may be isolated from flows and activities, enabling users to clone activities, flows, and job schedules.

In one or more embodiments, the job scheduling and management service 110 may support parallel and sequential tasks in a flow (e.g., as shown in FIG. 2). Complex flows may use both parallel and sequential actions. The job scheduling and management service 110 may allow for options to fail or continue when an activity of a flow fails, and an option to skip some activities when executing a flow.

In one or more embodiments, execution of any activity may include multiple tasks, such as a precondition check, an execution instance insertion, a job execution task, a check job status task, an update execution instance task, and the like. For example, a the execution instance insertion task may involve the job scheduling and management service 110 inserting an indication of the instance into the execution instances database 324, and the update execution instance task may involve the job scheduling and management service 110 updating the indication of the instance in the execution instances database 324 (e.g., whether the instance 315 has completed based on the check job status task). The precondition check may require the job scheduling and management service 110 to verify that one or more preconditions have been satisfied (e.g., as defined by a job) before execution.

In one or more embodiments, the job scheduling and management service 110 may use a functional mapping of an activity that may be a hybrid of multiple state machine languages, including a data lake state machine language, allowing for multiple tasks defined by activities to be tied together. For example, the data lake state machine language may have a "TaskType" that may be either "data lake" or "step function." The data lake TaskType may be a check precondition task, insert execution instance task, job execution task, check job status task, or update execution instance task. A step function TaskType may be a sequence of serverless functions involving one or more of the services 112. The data lake TaskType may have specific fields, such as a wait time field and a timeout field. The wait time field may define a wait time between subsequent tries (e.g., a check precondition and a check job status). The timeout field may provide a timeout for a particular task. Common fields for both the data lake and step function task types may include a name of the task step and a type of task.

The one or more devices 302 may be configured to communicate via a communications network 370, and/or the cloud-based network 310 may be configured to communicate via a communications network 380, wirelessly or wired (e.g., the same or different wireless communications networks). The communications network 370 and/or the communications network 380 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 370 and/or the communications network 380 may have any suitable communication range associated therewith and may include, for example, global networks (e.g., the Internet), metropolitan area networks (MANs), wide area networks (WANs), local area networks (LANs), or personal area networks (PANs). In addition, communications network 370 and/or the communications network 380 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Figure 4:
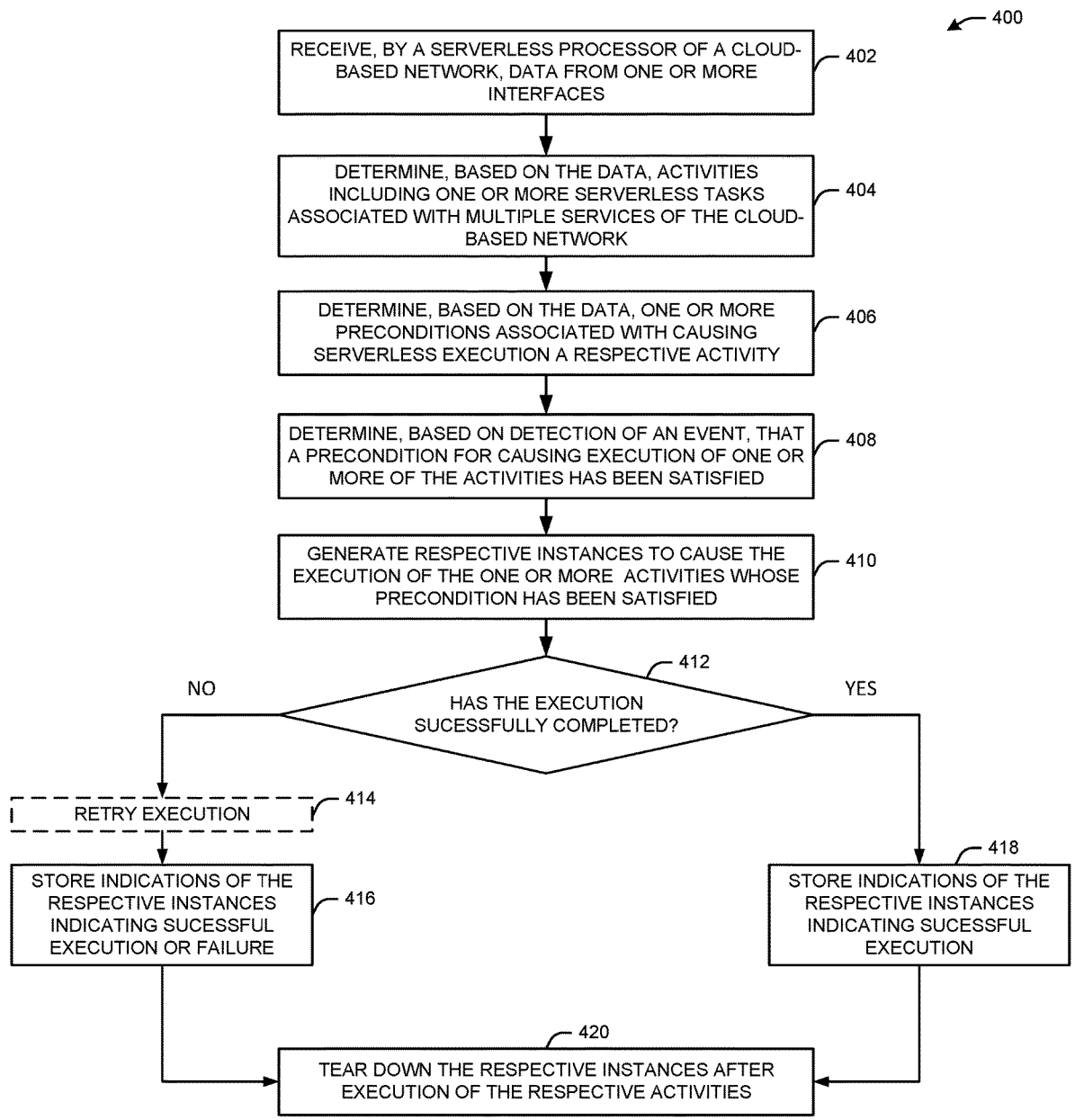
FIG. 4 illustrates a flow diagram for a process for orchestrating cloud-based jobs for serverless applications, in accordance with one or more example embodiments of the present disclosure.

FIG. 4 illustrates a flow diagram for a process 400 for orchestrating cloud-based jobs for serverless applications, in accordance with one or more example embodiments of the present disclosure.

At block 402, a system (or device, e.g., the cloud-based network 106 of FIG. 1 and of FIG. 3) may receive data from data from one or more interfaces that may be service-agnostic (e.g., the one or more service-agnostic APIs 108 of FIG. 1, the API gateway 312 of FIG. 3). The one or more interfaces may be exposed to end users (e.g., the device 104 of FIG. 1, the one or more devices 302 of FIG. 3), and may allow for the sending of large amounts of data (e.g., structured or unstructured), activities, flows, and/or jobs to be performed using serverless computing and one or more services provided by the system.

At block 404, the system may determine, based on the received data, activities, any activity including one or more serverless tasks to be performed in relation to one or more services provided by the system. Serverless computing instances may include storage that last only for the duration of an instance, and may be discarded once the tasks executed by the instance have completed. The system may orchestrate jobs for serverless applications. For example, flows (e.g., included in the received data) using one or more activities may invoke customized user-defined tasks involving event-driven serverless computing services, batch computing services, data preparation and loading services, message queuing services, system-to-system messaging services, application-to-person messaging services, and the like. A user may provide job context to the system, and the system may coordinate with other services to generate resources, manage flows and jobs, and send notifications associated with the management and scheduling of flows and jobs. The system may provide flexibility to build custom workflows that may involve multiple services provided by a network computing environment, perform sequential and parallel tasks, and facilitate use of cross-account resources.

At block 406, the system may determine, based on the data, one or more event-based preconditions that when satisfied may cause serverless execution(s) of the one or more activities identified in the received data. For example, event-based on-demand instances (e.g., virtual containers generated by machine images) may facilitate job scheduling (e.g., instead of data driven instances, for example). When a precondition for an activity is satisfied, an on-demand serverless service may be instantiated and run in a different environment (e.g., a stateless execution) to facilitate scheduling and/or execution of the activity (or any flow that includes the job).

At block 408, the system may determine, based on a detection of the event that is the event-based precondition, that the precondition has been satisfied. Events and rules may be defined by users to schedule execution of flows. When a job is triggered by an event or rule to run, and when the job is scheduled, the system may build a state machine and store a resource name (e.g., uniquely identifying a resource in the network computing environment) in a job table, and may enable an event to trigger the execution of the job. For example, the event-based trigger may be based on detected data modifications made in a cloud-based network, other API calls, modification of content of the services, or many other types of events. Events may be on-demand in a synchronous or asynchronous manner.

At block 410, the system may generate respective instances to cause execution and/or scheduling of any activity whose precondition was determined to be satisfied at block 408. Serverless computing may execute code in response to events, allowing on-demand applications that may execute within milliseconds of an event. Serverless computing instances may include storage that last only for the duration of an instance, and may be discarded once the tasks executed by the instance have completed. In this manner, the system may generate serverless computing instances in a cloud-based environment to perform scheduling and/or execution of any actions (or flows including actions) without requiring APIs or other interfaces dedicated to any particular service involved in the performance of the tasks associated with an activity.

At block 412, the system may perform a status check to determine whether an execution of an activity has completed successfully. When an activity does not complete successfully, the system optionally may retry execution at block 414 (e.g., as defined by a job from the received data at block 402). The system may retry execution multiple times. When the execution eventually succeeds or fails too many times, the system may store a respective indication of the generated instance and whether the execution succeeded or failed at block 416.

When the execution completes successfully at block 412, the system may, at block 418, store a respective indication of the generated instance and whether the execution succeeded or failed at block 418. In this manner, the instance data may persist even after the instance has concluded and been torn down (e.g., regardless of successful or failed performance of an action).

At block 420, the system may tear down (e.g., discard, delete) a respective instance after the serverless execution of the tasks for an activity (or after too many failed executions). In this manner, the instance may endure only until tasks defined by actions have been performed, and then may be torn down, yet the records of the instances and their performance may persist.

Figure 5:
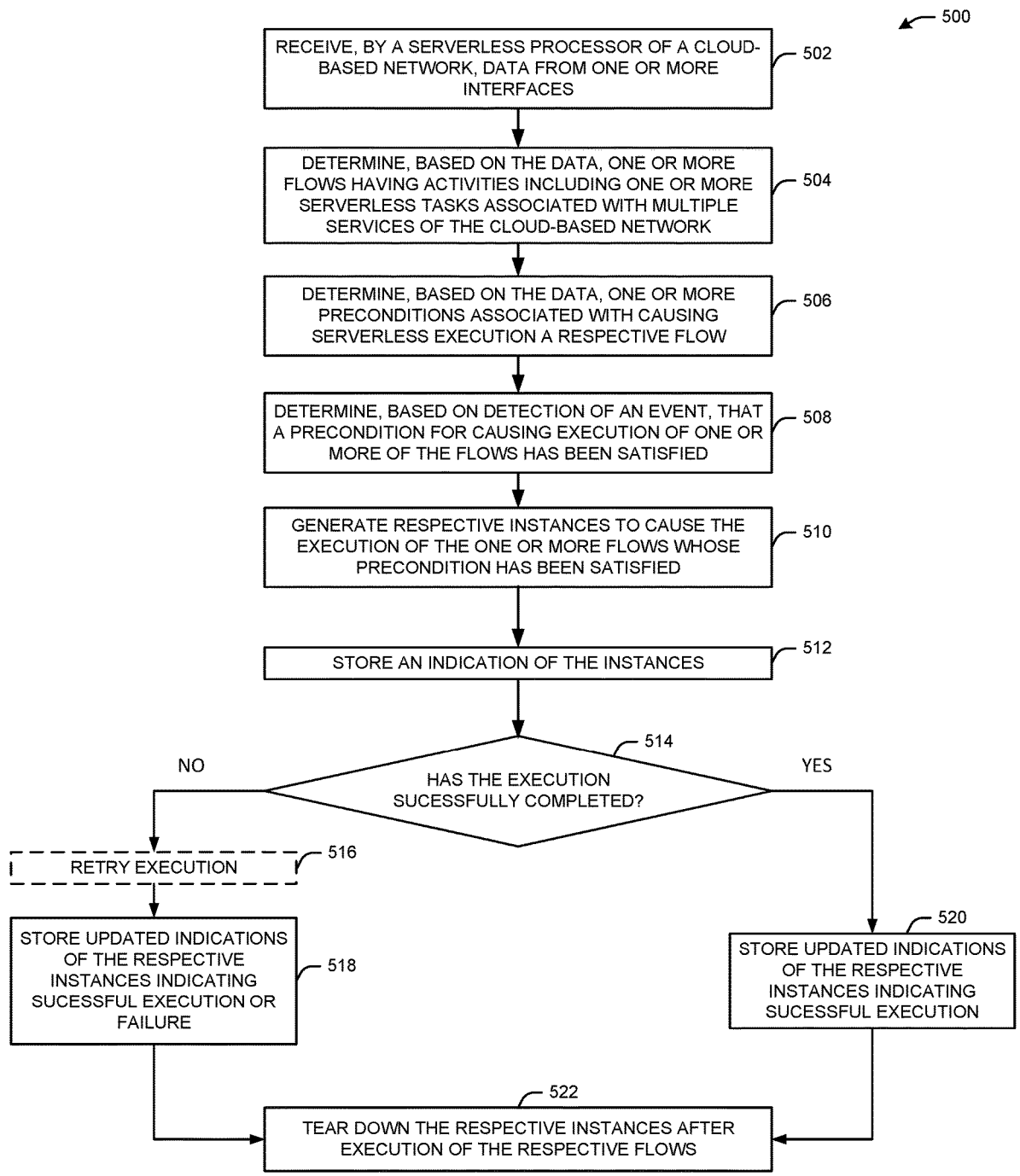
FIG. 5 illustrates a flow diagram for a process for orchestrating cloud-based jobs for serverless applications, in accordance with one or more example embodiments of the present disclosure.

FIG. 5 illustrates a flow diagram for a process 500 for orchestrating cloud-based jobs for serverless applications, in accordance with one or more example embodiments of the present disclosure.

At block 502, a system (or device, e.g., the cloud-based network 106 of FIG. 1 and of FIG. 3) may receive data from data from one or more interfaces that may be service-agnostic (e.g., the one or more service-agnostic APIs 108 of FIG. 1, the API gateway 312 of FIG. 3). The one or more interfaces may be exposed to end users (e.g., the device 104 of FIG. 1, the one or more devices 302 of FIG. 3), and may allow for the sending of large amounts of data (e.g., structured or unstructured), activities, flows, and/or jobs to be performed using serverless computing and one or more services provided by the system.

At block 504, the system may determine, based on the received data, flows including activities, where any activity may include one or more serverless tasks to be performed in relation to one or more services provided by the system. Serverless computing instances may include storage that last only for the duration of an instance, and may be discarded once the tasks executed by the instance have completed. The system may orchestrate jobs for serverless applications. For example, flows (e.g., included in the received data) using one or more activities may invoke customized user-defined tasks involving event-driven serverless computing services, batch computing services, data preparation and loading services, message queuing services, system-to-system messaging services, application-to-person messaging services, and the like. A user may provide job context to the system, and the system may coordinate with other services to generate resources, manage flows and jobs, and send notifications associated with the management and scheduling of flows and jobs. The system may provide flexibility to build custom workflows that may involve multiple services provided by a network computing environment, perform sequential and parallel tasks, and facilitate use of cross-account resources.

At block 506, the system may determine, based on the data, one or more event-based preconditions that when satisfied may cause serverless execution(s) of the one or more flows identified in the received data. For example, event-based on-demand instances (e.g., virtual containers generated by machine images) may facilitate job scheduling (e.g., instead of data driven instances, for example). When a precondition for a flow is satisfied, an on-demand serverless service may be instantiated and run in a different environment (e.g., a stateless execution) to facilitate scheduling and/or execution of the flow.

At block 508, the system may determine, based on a detection of the event that is the event-based precondition, that the precondition has been satisfied. Events and rules may be defined by users to schedule execution of flows. When a job is triggered by an event or rule to run, and when the job is scheduled, the system may build a state machine and store a resource name (e.g., uniquely identifying a resource in the network computing environment) in a job table, and may enable an event to trigger the execution of the job. For example, the event-based trigger may be based on detected data modifications made in a cloud-based network, other API calls, modification of content of the services, or many other types of events. Events may be on-demand in a synchronous or asynchronous manner.

At block 510, the system may generate respective instances to cause execution and/or scheduling of any flow whose precondition was determined to be satisfied at block 508. Serverless computing may execute code in response to events, allowing on-demand applications that may execute within milliseconds of an event. Serverless computing instances may include storage that last only for the duration of an instance, and may be discarded once the tasks executed by the instance have completed. In this manner, the system may generate serverless computing instances in a cloud-based environment to perform scheduling and/or execution of any flows without requiring APIs or other interfaces dedicated to any particular service involved in the performance of the tasks associated with an activity of the flow.

At block 512, the system may perform a status check to determine whether an execution of an activity has completed successfully. When an activity does not complete successfully, the system optionally may retry execution at block 514 (e.g., as defined by a job from the received data at block 502). The system may retry execution multiple times. When the execution eventually succeeds or fails too many times, the system may store a respective indication of the generated instance and whether the execution succeeded or failed at block 516.

When the execution completes successfully at block 512, the system may, at block 518, store a respective indication of the generated instance and whether the execution succeeded or failed at block 518. In this manner, the instance data may persist even after the instance has concluded and been torn down (e.g., regardless of successful or failed performance of an action).

At block 520, the system may tear down (e.g., discard, delete) a respective instance after the serverless execution of the tasks for an activity (or after too many failed executions). In this manner, the instance may endure only until tasks defined by actions have been performed, and then may be torn down, yet the records of the instances and their performance may persist.

These examples are not meant to be limiting.

Figure 6:
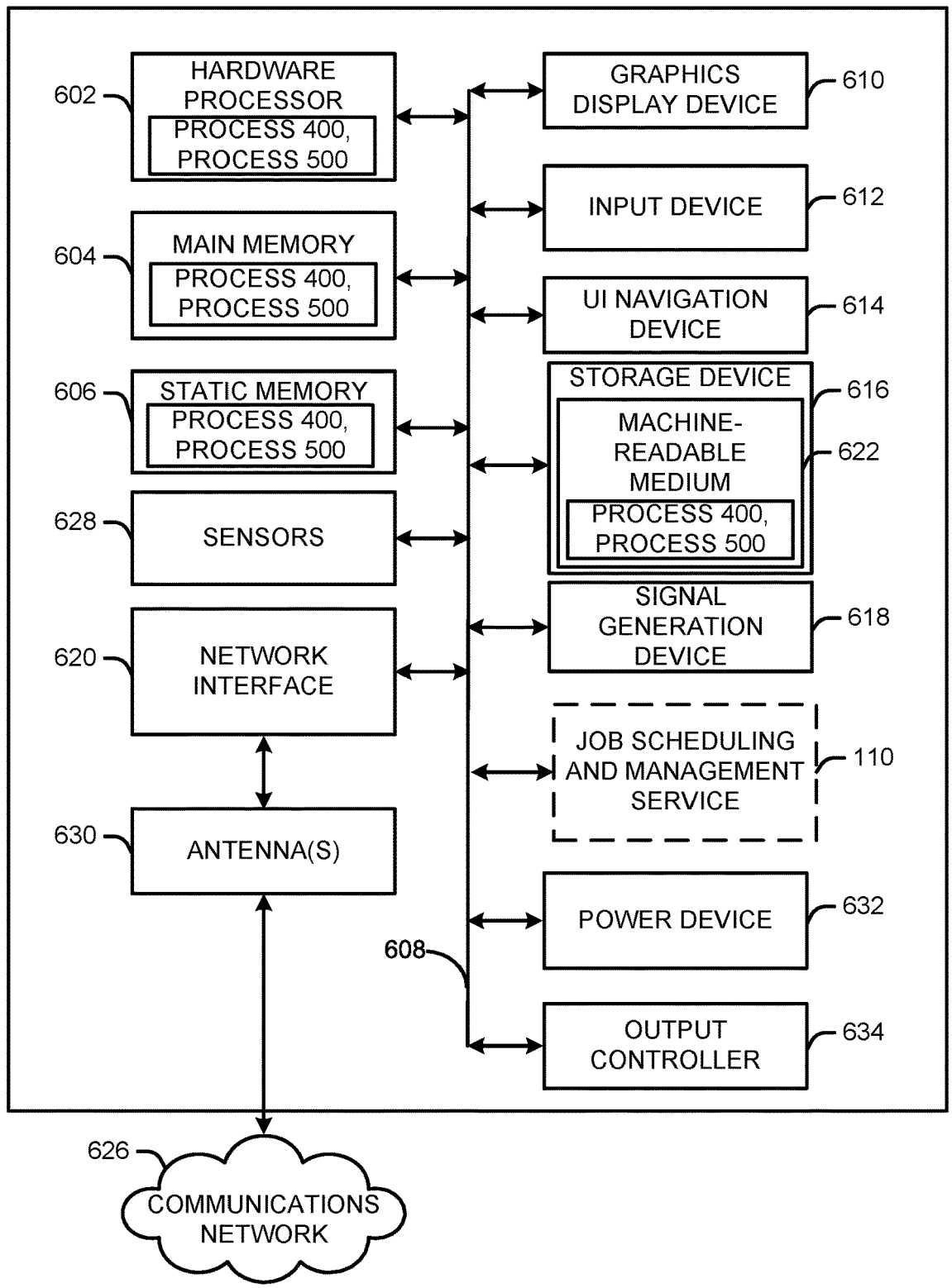
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 or system (e.g., the device 104 of FIG. 1, the cloud-based network 106 of FIG. 1 and of FIG. 3, the one or more devices 302 of FIG. 3) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a personal digital assistant (PDA), a mobile telephone, a wearable computer device, a web appliance, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, the job scheduling and management service 110 of FIG. 1 and of FIG. 3 (e.g., one or more modules capable of performing the process 400 of FIG. 4 and/or the process 500 of FIG. 5), a network interface device/transceiver 620 coupled to antenna(s) 630, and one or more sensors 628, such as a global positioning system (GPS) sensor, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions (e.g., software) embodying or utilized by any one or more of the techniques or functions described herein. The instructions may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MIS 0) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
receiving, by at least one serverless processor of a cloud-based network, data from a first application programming interface (API);
determining, by the at least one serverless processor, based on the data, a workflow including a first activity and a second activity, the first activity comprising a first serverless task associated with a first service of the cloud-based network, and the second activity comprising a second serverless task associated with a second service of the cloud-based network;
determining, by the at least one serverless processor, based on the data, a precondition associated with causing execution of the workflow;
determining, by the at least one serverless processor, that an event associated with the cloud-based network has occurred;
determining, by the at least one serverless processor, based on the occurrence of the event, that the precondition has been satisfied;
executing, by the at least one serverless processor, based on the satisfaction of the precondition, the workflow by performing the first activity and the second activity using a serverless instance;
storing, by the at least one serverless processor, an indication of the serverless instance;
discarding the serverless instance after the performance of the first activity and the second activity, wherein the indication remains stored after the discarding of the serverless instance;
receiving, by the at least one processor, second data from the API;
determining, by the at least one processor, based on the second data, a second workflow including the first activity and a third activity, the third activity comprising a third serverless task associated with a third service of the cloud-based network; and
executing the second workflow by performing the first activity and the third activity using a second serverless instance.

2. The method of claim 1, further comprising:
determining, based on the data, a schedule comprising a time at which to execute the workflow, wherein executing the workflow is further based on the schedule.

3. The method of claim 1, further comprising:
determining, based on the data, that the first activity may be skipped and that the execution of the workflow may continue when the second activity fails,
wherein executing the workflow skips the first activity and continues after failure to execute the second activity.

4. The method of claim 1, further comprising:
determining, based on the second data, a second precondition associated with causing execution of the second workflow;
determining that a second event associated with the cloud-based network has occurred;
determining, based on the occurrence of the second event, that the second precondition has been satisfied, wherein executing the second workflow is based on the satisfaction of the second precondition;
storing an indication of the second serverless instance; and
discarding the second serverless instance after the performance of the first activity and the third activity.

5. A method comprising:
receiving, by at least one serverless processor of a cloud-based network, data from a first interface;
determining, by the at least one serverless processor, based on the data, a first activity and a second activity, the first activity comprising a first serverless task associated with a first service of the cloud-based network, and the second activity comprising a second serverless task associated with a second service of the cloud-based network;
determining, by the at least one serverless processor, based on the data, a precondition associated with causing serverless execution of the first activity and the second activity;
determining, by the at least one serverless processor, that an event associated with the cloud-based network has occurred;
executing, based on the occurrence of the event, the first activity and the second activity using a serverless instance;
discarding the serverless instance after the serverless execution of the first activity and the second activity;
receiving second data from the first interface;
determining, based on the second data, a workflow including the first activity and a third activity, the third activity comprising a third serverless task associated with a third service of the cloud-based network; and
executing the workflow, wherein the execution of the workflow comprises performing the first activity and the third activity using a second serverless instance.

6. The method of claim 5, wherein the workflow is indicative of a sequential execution of the first activity and the second activity, and
wherein executing the first activity and the second activity comprises performance of the first activity before performance of the second activity.

7. The method of claim 5, wherein the workflow is indicative of a parallel execution of the first activity and the second activity, and
wherein executing the first activity and the second activity comprises concurrent performance of the first activity and the second activity.

8. The method of claim 5, further comprising:
determining, based on the data, a schedule comprising a time at which to execute the first activity and the second activity; and
generating the serverless instance based on the schedule.

9. The method of claim 5, further comprising:
determining, based on the data, at least one of:
that the first activity may be skipped,
that executing the workflow may continue when the second activity fails,
a number of retries for the first activity,
a time between retries for the first activity,
that the first serverless task may be rerun, or
that the first activity may disabled upon a failure to execute.

10. The method of claim 5, further comprising:
determining, based on the second data, a second precondition associated with causing execution of the workflow;
determining that a second event associated with the cloud-based network has occurred;

determining, based on the occurrence of the second event, that the second precondition has been satisfied, wherein executing the workflow is based on the satisfaction of the second precondition;

storing an indication of the execution of the workflow; and discarding the second serverless instance after the performance of the first activity and the third activity.

11. The method of claim 5, further comprising:

storing a first indication of the serverless instance;

determining a status associated with the execution of the first activity and the second activity, the status indicating a completion or a failure of the execution of the first activity and the second activity; and storing a second indication of the serverless instance, the second indication indicative of the completion or the failure of the execution of the first activity and the second activity.

12. The method of claim 5, further comprising:

determining, based on the data, that the first serverless task is a data lake task; and determining, based on the data lake task, a wait time between a first attempt to perform the first serverless task and a second attempt to perform the second serverless task, wherein the execution of the first activity is based on the wait time.

13. The method of claim 5, further comprising:

determining, based on the data, a group identifier associated with the first activity and the second activity;

determining that a list of authenticated group identifiers comprises the group identifier; and generating the serverless instance based on determining that the list of authenticated group identifiers comprises the group identifier.

14. The method of claim 5, further comprising:

determining, based on the data, a first schedule associated with the execution of the first activity and the second activity;

generating the serverless instance based on the first schedule;

determining, based on the data, a second schedule associated with serverless execution of the first activity and the second activity;

executing, based on the second schedule, the first activity and the second activity using a second serverless instance; and discarding the second serverless instance after the serverless execution of the first activity and the second activity.

15. The method of claim 5, further comprising:

determining, based on the data, a number of times that the workflow is to be executed; and generating the serverless instance based on the number of times that the workflow is to be executed.

16. The method of claim 5, further comprising storing an indication of the serverless instance, wherein the indication of the serverless instance remains stored after the discarding of the serverless instance.

17. A system comprising memory coupled to at least one serverless processor, the at least one serverless processor configured to:

receive, at a cloud-based network, data from a first interface;

determine, based on the data, a first activity and a second activity, the first activity comprising a first serverless task associated with a first service of the cloud-based network, and the second activity comprising a second serverless task associated with a second service of the cloud-based network;

determine, based on the data, a precondition associated with causing serverless execution of the first activity and the second activity;

determine that an event associated with the cloud-based network has occurred;

execute the first activity and the second activity using a serverless instance;

discard the serverless instance after the execution of the first activity and the second activity;

receive second data from the first interface;

determine, based on the second data, a workflow including the first activity and a third activity, the third activity comprising a third serverless task associated with a third service of the cloud-based network; and execute the workflow, wherein the execution of the workflow comprises performing the first activity and the third activity using a second serverless instance.

18. The system of claim 17, wherein the at least one serverless processor is further configured to:

receive third data from the first interface;

determine, based on the third data, a second workflow including the first activity and a third activity, the third activity comprising a third serverless task associated with a third service of the cloud-based network;

determine, based on the third data, a second precondition associated with causing serverless execution of the second workflow;

determine that a second event associated with the cloud-based network has occurred;

determine, based on the occurrence of the second event, that the second precondition has been satisfied;

execute, based on the satisfaction of the second precondition, the second workflow, the first activity and the third activity using a second serverless instance;

store an indication of the execution of the second workflow; and discard the second serverless instance after the executing the first activity and the third activity.

19. The system of claim 17, wherein the at least one serverless processor is further configured to:

determine, based on the data, a first schedule associated with the execution of the first activity and the second activity;

generating the serverless instance based on the first schedule;

determine, based on the data, a second schedule associated with a second serverless performance of the first activity and the second activity;

execute, based on the second schedule, the first activity and the second activity using a second serverless instance; and discard the second serverless instance after the execution of the first activity and the second activity based on the second schedule.

20. The system of claim 17, wherein the at least one serverless processor is further configured to store an indication of the serverless instance, wherein the indication of the serverless instance remains stored after the discarding of the serverless instance.

* * * * *